US006853315B2

(12) United States Patent
Schiller et al.

(10) Patent No.: US 6,853,315 B2
(45) Date of Patent: Feb. 8, 2005

(54) PIEZOELECTRIC RATE SENSOR SYSTEM AND METHOD

(75) Inventors: Peter J. Schiller, Coon Rapids, MN (US); Timothy R. Moncur, Maple Grove, MN (US); Barron Johnson, Eden Prairie, MN (US)

(73) Assignee: Triad Sensors, Inc., Minneapolis, MN (US)

( * ) Notice: Subject to any disclaimer, the term of this patent is extended or adjusted under 35 U.S.C. 154(b) by 15 days.

(21) Appl. No.: 10/055,186

(22) Filed: Jan. 23, 2002

(65) Prior Publication Data

US 2003/0137433 A1 Jul. 24, 2003

(51) Int. Cl.[7] ............................................. G01C 21/00
(52) U.S. Cl. ...................... 340/974; 73/178 R; 33/328
(58) Field of Search .................. 340/973, 974, 340/971, 975, 979, 967; 701/14; 73/178 R, 503.3, 504.08, 514.34, 504.14, 504.12, 504.13; 33/328, 320, 361, 355 R, 366

(56) References Cited

U.S. PATENT DOCUMENTS

| | | | |
|---|---|---|---|
| 4,283,705 A | 8/1981 | James et al. ............... 73/178 R |
| 4,583,094 A | 4/1986 | Mosier ........................ 340/975 |
| 4,598,292 A | 7/1986 | Devino ........................ 340/973 |
| 4,655,081 A | * 4/1987 | Burdess ........................ 73/505 |
| 4,699,006 A | * 10/1987 | Boxenhorn ............. 73/517 AV |
| 5,218,867 A | * 6/1993 | Varnham et al. ............... 73/505 |
| 5,226,321 A | * 7/1993 | Varnham et al. ............... 73/505 |
| 5,365,799 A | 11/1994 | Okada ................... 73/862.091 |
| 5,488,862 A | * 2/1996 | Neukermans et al. .... 73/504.02 |
| 5,495,760 A | * 3/1996 | Wirt .......................... 73/504.13 |
| 5,629,483 A | 5/1997 | Nakamura et al. ........ 73/514.34 |
| 5,646,346 A | 7/1997 | Okada .......................... 73/511 |
| 5,652,385 A | 7/1997 | Nakamura et al. ........ 73/514.89 |
| 5,668,318 A | 9/1997 | Okada ..................... 73/504.11 |
| 5,679,896 A | 10/1997 | Nakamura et al. ........ 73/514.29 |
| 5,681,994 A | 10/1997 | Nakamura et al. ........ 73/514.34 |

(List continued on next page.)

FOREIGN PATENT DOCUMENTS

EP          0485132 A2      5/1992

OTHER PUBLICATIONS

"You've Got An Image to Maintain", Product Brochure, BF Goodrich Avionics Systems, 1999.

(List continued on next page.)

Primary Examiner—Brent A. Swarthout
(74) Attorney, Agent, or Firm—Dorsey & Whitney LLP

(57) ABSTRACT

A compact, lightweight, cost effective, self-contained standby electronic navigation system with high signal-to-noise ratio and good dynamic stability is provided. The system includes a first sensor module for providing a plurality of rotational rate signals, a second sensor module for providing a plurality of compensation signals, and a microcontroller module for processing the rotational rate signals and the compensation signals and sending the signals to a display for displaying attitude information, directional information, and turn coordinate information on a single screen simultaneously. In one embodiment, the first sensor module includes a plurality of rotational sensors made of piezoelectric elements. The piezoelectric elements are made from a single sheet of piezoelectric material so that the elements possess uniform characteristics, and are arranged to reduce systematic drift and random noise normally present in a rotational rate sensor. The sensors can be configured on a single multi-sensor chip.

14 Claims, 11 Drawing Sheets

U.S. PATENT DOCUMENTS

| | | | |
|---|---|---|---|
| 5,682,000 A | | 10/1997 | Okada ...................... 73/514.34 |
| 5,734,246 A | * | 3/1998 | Falangas ..................... 318/649 |
| 5,770,799 A | * | 6/1998 | Nakamura et al. ....... 73/514.34 |
| 5,773,916 A | | 6/1998 | Nakamura et al. .......... 310/357 |
| 5,780,749 A | | 7/1998 | Okada .................. 73/862.043 |
| 5,824,903 A | | 10/1998 | Nakamura et al. ....... 73/514.34 |
| 5,850,040 A | | 12/1998 | Okada ..................... 73/504.04 |
| 5,874,674 A | * | 2/1999 | Kasanami et al. ....... 73/504.14 |
| 5,900,551 A | | 5/1999 | Nakamura et al. ....... 73/514.34 |
| 5,920,321 A | | 7/1999 | Owen et al. ................. 345/427 |
| 6,112,140 A | | 8/2000 | Hayes et al. .................. 701/14 |
| 6,391,672 B2 | * | 5/2002 | Namerikawa et al. ........ 438/50 |

OTHER PUBLICATIONS

"Triad Sentinel Standby Gyroscopic Navigation System", Product Overview, Jul. 2001.

"Goodrich Avionics & Lighting Systems—GH–3000", Website printout, Aug. 31, 2001.

Communication Relating to the Results of the Partial International Search.

* cited by examiner

PIEZOELECTRIC RATE SENSOR SYSTEM AND METHOD

CROSS-REFERENCE TO RELATED APPLICATION(S)

None.

FIELD OF THE INVENTION

The present invention relates generally to aircraft instruments, and more particularly, to a gyroscopic navigation system for a small aircraft's primary instruments, such as an attitude indicator (AI), a directional gyro (DG), and a turn coordinator (TC)/slip-skid indicator.

BACKGROUND OF THE INVENTION

All aircraft, large and small, production or experimental, depend on gyroscopes for a variety of navigational data. Most aircraft utilize mechanical or spinning-mass gyros to derive information, such as heading and attitude. Often housed in a remote location, an aircraft's gyro (or gyros) feed data back to a cockpit, which are displayed in a variety of instruments.

The standard primary instruments in small aircraft, such as experimental airplanes, or aircraft used in general aviation, include an attitude indicator, a heading indicator, and a turn coordinator/slip-skid indicator. An attitude indicator, also known as an artificial horizon, shows the relationship of a nose and wings to an aircraft's horizontal plane. In addition, a heading indicator, also known as a directional gyro, is used to counteract errors that occur in a magnetic compass during turns, speed changes, and turbulence. A turn coordinator/slip-skid indicator measures the rate and quality of a turn. During IFR (Instrument Flight Rules) flight, these instruments, especially an attitude indicator, are pilot's means of determining an aircraft's situation.

The standard primary instruments in small aircraft currently contain vacuum or electrically-driven mechanical gyroscopes. Loss of vacuum or electrical power, especially during instrument flight, renders these instruments useless and can result in pilot disorientation and, at times, fatal crashes.

There is an increasing focus within the aviation industry about the failure of mechanical gyroscopes and the lack of proper backup systems. The FAA recently published a safety pamphlet entitled "The Silent Emergency" that emphatically states that pilots of small aircraft should install backup systems for their aircraft. In addition, the Experimental Aircraft Association (EAA) is also actively promoting the adoption of standby gyroscopic navigation system.

A standby gyroscopic navigation system has been used in many commercial aircraft. Typically, in a commercial aircraft, a second set of primary instruments are installed independently as a standby navigation system to ensure that there are at least one set of properly functioned gyroscopes, in case that vacuum or electrical power of the other system fails. However, the cost of having a second set of primary instruments is prohibitively expensive for a small aircraft. In addition, a small aircraft is extremely sensitive to extra weight. Further, cockpit size and instrument panel space are very limited in small aircraft.

Other types of standby navigation systems have been developed, for example, Goodrich ESIS GH-3000 system. The Goodrich system is an electronic standby instrument system. The system provides navigation information such as attitude, altitude, airspeed, heading, etc., and the information is presented on a screen display. However, the system is not user-friendly. According to the Goodrich system's Pilot Guide, the attitude, altitude, airspeed, heading, and other navigation features are not displayed on a LCD screen display simultaneously. The Goodrich system displays navigation features on different screens selected by a mode selector. A pilot must change the screens to obtain different navigation features in flight. This increases pilot's cockpit management load, thereby reducing overall pilot awareness, which is considered dangerous in operating a small aircraft. In addition, the Goodrich system is generally too heavy and too costly for a small aircraft.

One of the main parameters related to performance of an electronic instrument system is signal-to-noise ratio. Typically, there are two types of noise; random noise and correlated noise. Random noise are typically caused by characteristics of a device, such as the sensitivity of a sensor, etc. Factors that contribute to correlated noise include temperature, vibration, electromagnetic fields, etc. Discrimination between signal and noise determines the performance of an electronic instrument system.

Another parameter related to performance of an electronic instrument is the drift of indication, often referred to as dynamic stability. For example, when an aircraft makes a constant angle turn and holds at that angle, gyro instruments should indicate holding at that angle as well. However, due to the instability, gyro instruments can only hold for a certain period of time and then tend to drift back to a level position. Even though an aircraft does not normally turn and hold an angle for longer than 3 minutes, the drift is an important parameter for performance. Typically, existing standby instrument systems can hold about 3–4 minutes before drifting back to a level position. It is desirable to have a system with longer holding time.

Accordingly, there is a need for an improved electronic navigation system. More specifically, there is a need for a compact, lightweight, cost effective electronic navigation system with higher signal-to-noise ratio and better dynamic stability.

SUMMARY OF THE INVENTION

To solve the above and the other problems, the present invention provides a gyroscopic navigation system having an internal battery backup. The system may operate as a standby gyroscopic navigation system that is independent of the aircraft's primary vacuum and electrical systems and provides key navigational information that is normally provided by an aircraft's primary instruments, such as an attitude indicator, directional gyro, and turn coordinator/slip-skid indicator, in the event of a catastrophic failure of the primary instruments. The system may also operate as a primary gyroscopic navigation system.

In one embodiment of the present invention, a standby gyroscopic navigation system is disclosed as an example.

Still in one embodiment, the standby gyroscopic navigation system is a three-dimensional, solid-state gyroscopic navigation system that is battery-driven and functions independently of the aircraft's primary power systems, both electric and vacuum. The gyroscopic navigation system includes a high-performance solid-state gyroscope, an on-board signal processing electronics, color liquid crystal display (LCD), and a back-up battery.

Further in one embodiment of the present invention, the standby gyroscopic navigation system includes a first sensor module for providing a plurality of rotational rate signals, a second sensor module for providing a plurality of compensation signals, a microcontroller module for processing the rotational rate signals and the compensation signals and sending the processed signals to a display to display navigation information such as attitude information, directional information, and turn coordinate information that is normally provided by an aircraft's primary instruments, such as an attitude gyro, a directional gyro, and a turn coordinator/slip-skid indicator.

Still in one embodiment, the standby gyroscopic navigation system includes a power management module for supplying power to the first sensor module, the second sensor module, the microcontroller module, and a LCD display, etc. The power management module includes a switch capable of switching between a primary power source and a battery power source. Under a normal condition, the switch is switched to connect to the primary power source, and at the mean time, the primary power source charges battery of the battery power source. In the event that the primary power source fails, the switch is automatically switched to connect to the battery power source. The battery power source then supplies power to the first and second sensor modules, the microcontroller module, and the LCD display, etc.

Further in one embodiment, the first sensor module includes a set of rotational rate sensors to provide rotational rates for pitch, roll, and yaw angles. The second sensor module includes a set of sensors to provide acceleration, magnetic field, and temperature compensation signals.

Yet in one embodiment, the standby gyroscopic navigation system includes a converter for converting the rotational rate signals and the compensation signals into digital signals before sending the signals to the microcontroller. Still in one embodiment, the provided navigation information is displayed on the single screen of the display simultaneously.

Further in one embodiment, the rotational rate sensors are solid-state, high-performance rotational rate sensors made of piezoelectric elements. The piezoelectric elements are made from a single sheet of piezoelectric material so that the elements possess uniform characteristics.

In one embodiment, the piezoelectric elements are arranged and configured in a circular shape with an inner ring and an outer ring disposed on a suspended membrane. The piezoelectric elements on the outer ring and the inner ring are a differential pair and are electrically connected to the pair of piezoelectric elements on the opposite side of the circular shape, respectively. Such arrangement reduces the systematic drift and random noise normally presented in a gyro rotational rate sensor. Alternatively, the piezoelectric elements are arranged and configured in an oval shape. The resonant frequency in the X-direction shifts relative to the resonant vibration frequency in the Y-direction in proportion to a ratio approximately the same ratio as the length to the width of the oval shape. The offset in resonant frequency further enhances the stability of the system because the resonant vibration modes parallel to a surface are not closely coupled.

In an additional embodiment of the present invention, the sensors of the gyroscopic navigation system, such as the gyro and compensation sensors, are configured on a multi-sensor silicon chip. The advantage of this embodiment is that the compensation signals are highly correlated to the rotational sensor or gyro signals. The high correlation is achieved from the fact, but not limited to, that the sensors are physically located in very close proximity and witness the same effects, manufactured using the same fabrication steps, and affected in a similar manner by temperature and electronic noise due to their similar structure. At the system or sub-system level, the multi-sensor chip also provides an improved degree of accuracy and compensation.

Furthermore, attitude, heading and bank angle information are displayed on a single display. One of the advantages of the present invention is that the system is autonomous. The system is connected to an aircraft's electrical system, but in the event of a failure, the system automatically reverts to battery power. The remarkable power efficiency of solid-state gyros enables the system to run for hours on battery power.

Another advantage of the present invention is that the system is a plug and play, maintenance free unit. The absence of moving parts lends the solid-state gyros an exceptionally long life and, unlike traditional gyros, the gyros of the present invention generally will not need rebuilding, thereby significantly reducing the cost.

A further advantage of the present invention is that the system is lightweight. Many pilots, especially those with a smaller high-performance aircraft, are particularly sensitive to extra weight. The weight of the system is preferably approximately 2.0 pounds or less, more preferably 1.0 pound or less.

An additional advantage of the present invention is that the system is rugged and is designed to withstand shocks of 1000 Gs or more.

Yet another advantage of the present invention is that the system is simple to retrofit. The system is compact and capable of fitting a standard instrument panel opening in the cockpit of an aircraft.

With respect to the heart of the standby navigation system, i.e. the gyros, the system in accordance with the principles of the present invention includes a solid-state microgyroscope (or "gyro"). The gyro generates an electrical signal output proportional to rotational rate. The gyro utilizes a plurality of precision thin-film piezoelectric elements to detect rotation, such as pitch, roll, and yaw, while rejecting spurious noise created by vibration, thermal gradients, and electromagnetic interference. During a normal operation, selected piezoelectric elements on the gyro are driven by a periodic signal to create a controlled mechanical oscillation. When the gyro is subjected to rotational motion, such as pitch, roll, or yaw, a characteristic electrical signal is produced across other piezoelectric elements on the gyro, according to the Coriolis Effect. These electrical signals are amplified and filtered to extract high-fidelity signals proportional to the rate of rotation.

Generally, piezoelectric materials are used in a variety of sensors and actuators. Piezoelectric materials convert mechanical energy to electrical energy and vice versa. For instance, if pressure is applied to a piezoelectric crystal, a voltage is generated in proportion thereby producing the function of a sensor. Generation of an electrical signal in response to an applied force or pressure is known as the "primary piezoelectric effect". Similarly, if an electrical voltage is applied to a piezoelectric crystal, it expands in proportion as an actuator. Geometric deformation (expansion or contraction) in response to an applied electric field is known as the "secondary piezoelectric effect". Whether operated as a sensor or actuator, electrically-conductive electrodes must be appropriately placed on a crystal for collection or application of the electrical energy, respectively. Therefore, a piezoelectric sensor/actuator generally includes a) a portion of piezoelectric material, and b)

electrically-conductive electrodes suitably arranged to direct/supply electrical energy to/from an electrical circuit, e.g. an amplifier/an external power source.

Piezoelectric materials have been utilized in the art to create a variety of simple sensors and actuators. Examples of sensors include vibration sensors, microphones, and ultrasonic sensors. Examples of actuators include ultrasonic transmitters and linear positioning devices. However, in most of these art examples, bulk piezoelectric material is machined and assembled in a coarse manner to achieve low-complexity devices.

By contrast, the gyroscopic navigation system in accordance with the principles of the present invention utilizes piezoelectric materials in a thin-film format. The thin-film enables transducers with a far higher degree of complexity of accuracy. Thin-films offer the following key advantages:

1) Matching—Thin-film piezoelectric materials are deposited and defined on an atomic scale by utilizing fabrication processes common in semiconductor industry. The result is that thin-film piezoelectric elements can be consistently manufactured with elements matching more than hundreds of times better than conventional bulk machined devices.

2) Density—Thin-film piezoelectric elements are defined using microlithography, a process which enables extremely small dimensions (less than 0.001 mm, or 1 micron) to be delineated in a consistent and controlled manner. The result is that a large number of precision piezoelectric elements can be defined on a single microscopic transducer device, enabling differential arrangements that reduce noise, e.g. drift.

3) Accuracy—In a thin-film format, piezoelectric materials exhibit reduced levels of random noise. At a system level, the effect of lower noise is more accurate readings.

4) Low-cost—Thin-film piezoelectric elements are defined using batch processing techniques common in the semiconductor industry. A typical deposition, pattern transfer, and etch sequence on a single silicon wafer defines literally millions of precision piezoelectric elements on thousands of transducers.

The above and other advantages are inherent to the present invention and enable novel configurations and unique features that increase the overall device and system performance.

While multiple embodiments are disclosed, still other embodiments of the present invention will become apparent to those skilled in the art from the following detailed description, wherein is shown and described only the embodiments of the invention, by way of illustration, of the best modes contemplated for carrying out the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

As an example, a standby gyroscopic navigation system 100 is disclosed in preferred embodiments of the present invention. It is appreciated that the system in accordance with the present invention may be used as a primary navigation system. The preferred embodiments of the present invention provide a three-dimensional, solid-state gyroscopic navigation system that is battery-driven and functions independently of the aircraft's primary power systems, both electric and vacuum.

Preferred embodiments of the standby gyroscopic navigation system 100 as shown in FIGS. 1–10 include high-performance solid-state gyroscopes, on-board signal processing electronics, color liquid crystal display (LCD), a back-up battery, and other sensors, such as magnetometers, etc.

The present invention reflects the trend to reduce pilot workload by displaying multiple functions on a single display. The system 100 simultaneously displays data, traditionally provided by three separate instruments, attitude indicator ("AI"), directional gyro ("DG") and turn coordinator ("TC")/slip-skid indicator, on a single display. Further, these traditionally analog instruments are simulated digitally, thereby easing the transition from traditional analog instruments to modern, all-digital system.

Figure 1:
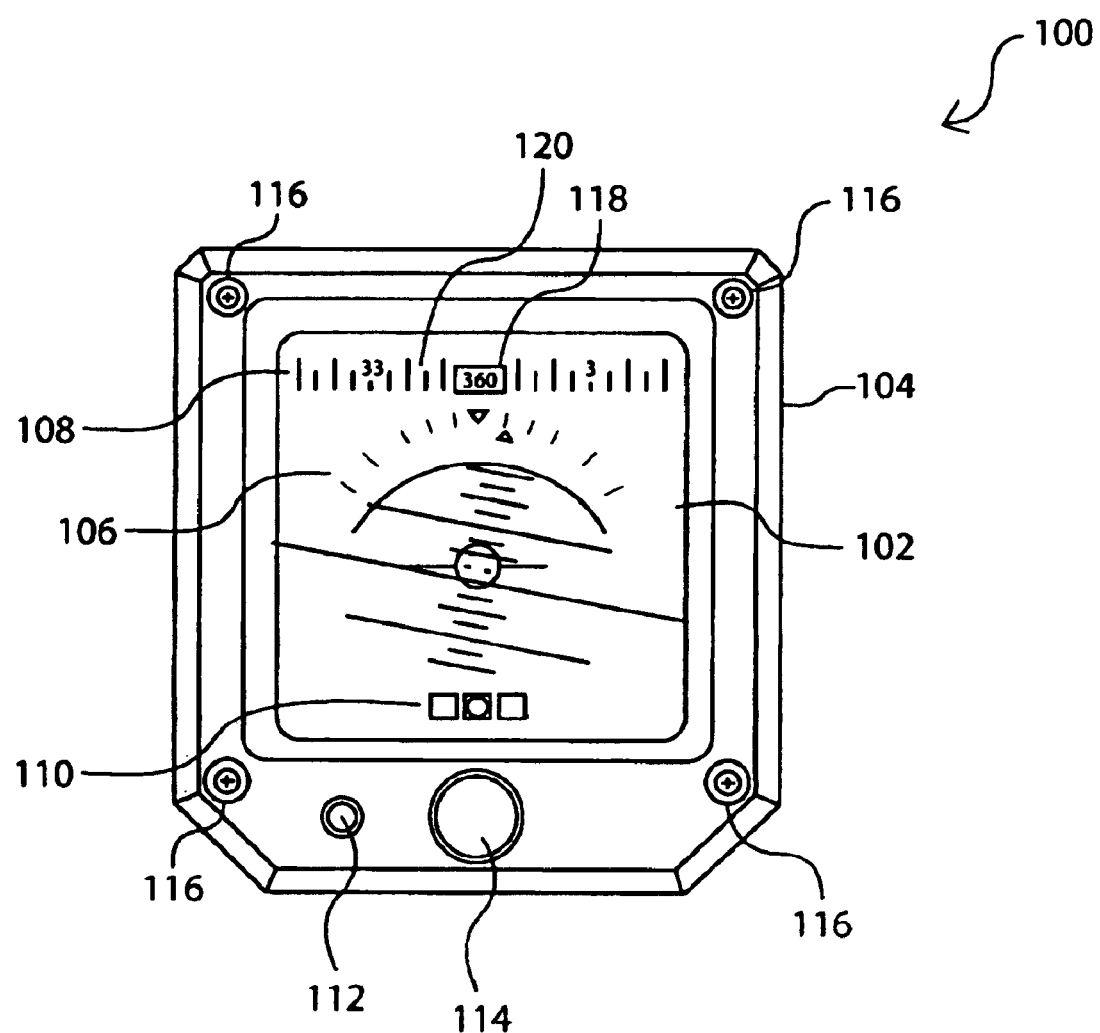
FIG. 1 is a schematic view of one embodiment of a gyroscopic navigation system, in accordance with the principles of the present invention, showing a LCD display of the gyroscopic navigation system.

FIG. 1 illustrates a schematic view of one embodiment of the standby gyroscopic navigation system 100 in accordance with the principles of the present invention. The system 100 is a miniature, compact, self-contained, lightweight unit. The system 100 preferably includes a LCD display 102 installed in a housing 104. The display 102 provides gyroscopic navigation information that is normally provided by an aircraft's primary instruments. The navigation information includes an AI information 106, a DG information 108, and a TC/slip-skid information 110. A reset push button 112 and a dial turn/push button 114 are disposed on the housing 104 and are used for programming preflight settings and in-flight adjustment. These gyroscopic navigation information are preferably presented on a single, clear, easy-to-read screen of the LCD display 102 simultaneously. The inclusion of the three primary navigation instruments in a single display greatly reduces the number of instruments that must be scanned during instrument flight and the uncertainty about the physical situation (e.g. attitude and heading) of the aircraft.

The DG information 108 provides a simulated analog directional "tape" with an inset digital readout 118 displaying the current directional heading of an aircraft in flight. This configuration gives a similar reading to the standard rotating DG with the accuracy and precision of a digital device.

The AI information 106 provides digital simulation of the standard analog AI. Both pitch (i.e. the elevation of the nose of an aircraft) and roll (i.e. the elevation of the wing of an aircraft), relative to the horizon, are displayed in a manner consistent with analog instruments.

The TC/slip-skid information 110 provides a digital simulation of turn coordinator/slip-skid ball, typically incorporated into an analog turn coordinator/slip-skid indicator. In an analog turn coordinator/slip-skid indicator, the mechanical slip/skid ball moves in relation to aircraft movement about a Z-axis of an aircraft, also known as the "yaw" movement. The system of the present invention recreates this measurement in a non-mechanical, digital format that gives a pilot more accurate yaw readings at a glance, in a well-accepted visual format.

The system 100 preferably weighs less than 2.0 pounds, more preferably 1.0 pound or less, and is able to withstand shocks of up to 1,000 Gs. The system 100 is preferably designed to fit into a standard instrument panel opening. In addition, the depth of the system 100 is preferably no more than 2 inches. As shown, the system 100 can be securely mounted onto an aircraft panel by a set of screws 116 or other similar mounting means. It is appreciated to a person skilled in the art that other appropriate sizes and weights for the system 100 can be used without departing from the scope of the invention.

The screen of the display 102 has preferably two colors to distinguish the areas above and below the artificial horizon. In one embodiment, the color above the artificial horizon is blue, and the color below is brown. It is appreciated that other color arrangements for the screen can be used within the scope of the present invention.

As shown in FIG. 1, the standby gyroscopic navigation system 100 indicates that an aircraft in flight is turning towards left at approximately 10 degrees, and the aircraft is climbing at an angle of approximately 3 degrees. In addition, the ball of the turn coordinator/slip-skid indicator 110 is at the middle, which indicates that the aircraft is coordinated in flight.

Also, a direction readout box 118 indicates that the heading of an aircraft is 360°. This allows a pilot to quickly acknowledge the heading of the aircraft without reading or counting directional markers 120.

Figure 2:
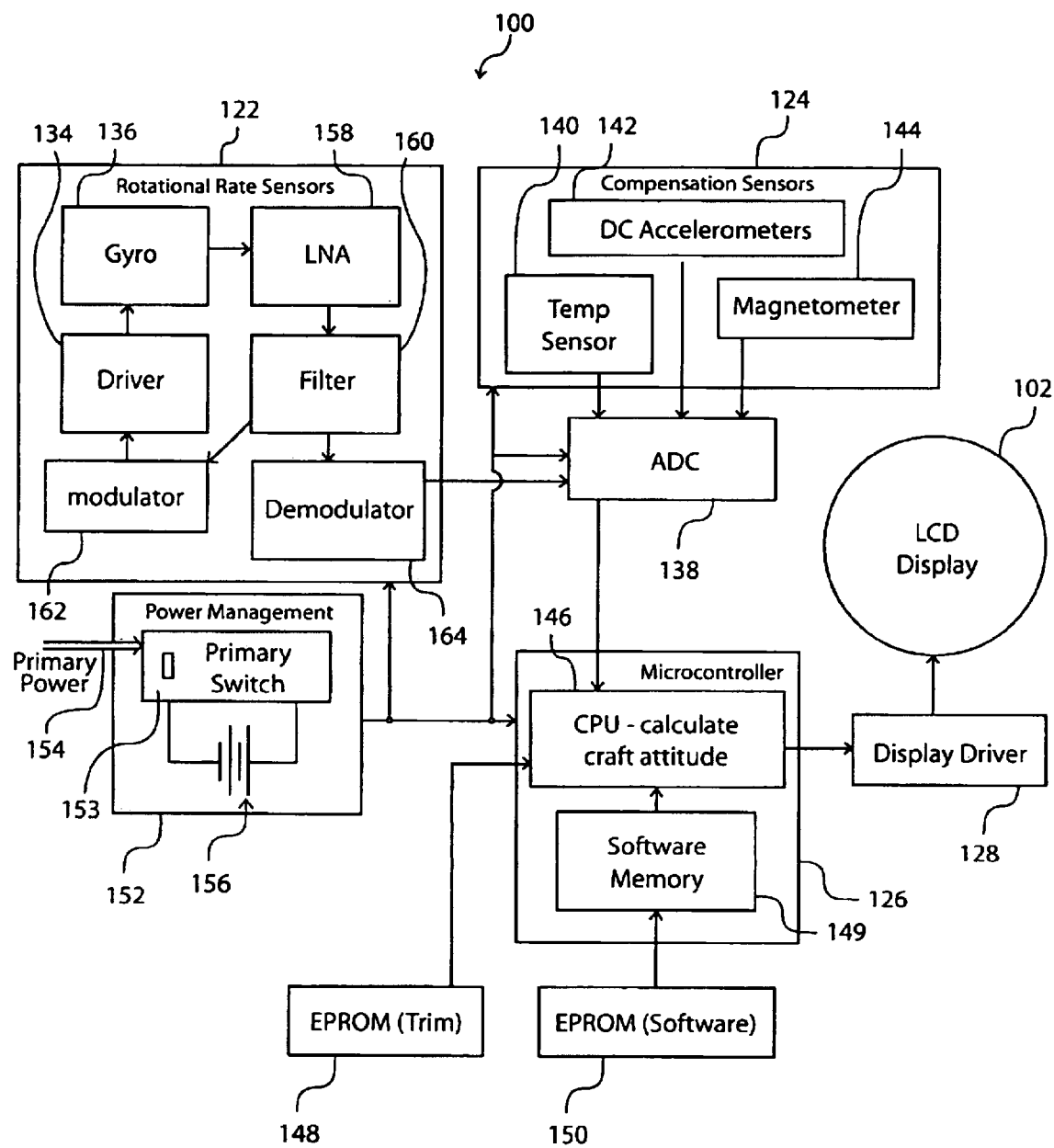
FIG. 2 is a functional block diagram of one embodiment of the gyroscopic navigation system, in accordance with the principles of the present invention.

FIG. 2 illustrates a functional block diagram of one embodiment of the standby gyroscopic navigation system 100 in accordance with the principles of the present invention. The system 100 integrates several key modules to collect, process, and display pertinent flight information such as pitch, roll, yaw, signals, etc. The system 100 includes a first sensor module 122 for providing a plurality of rotational rate signals, a second sensor module 124 for providing a plurality of compensation signals, a microcontroller module 126 for processing the rotational rate signals and the compensation signals and sending the processed signals to a display driver 128. The display driver 128 processes the signals and displays gyro navigational information that is normally provided by an aircraft's primary instruments, such as attitude gyro, directional gyro, and turn coordinator/slip-skid indicator, on the display 102.

The first sensor module 122 includes a plurality of rotational rate sensors or micro gyros 136. One of the sensors 136 is for a directional gyro 132, and the other one is for an attitude gyro 130 (see FIG. 3). A driver 134, e.g. an oscillator, provides oscillation signals to the rotational rate sensors 136 and receives feedback from a filter 160. The rotational rate sensors 136 provide rotational rates for pitch, roll, and yaw angles of an aircraft. The output electrical signals of the rotational rate sensors 136 are proportional to the rate of rotation in the pitch, roll, and yaw directions.

The second sensor module 124 includes a plurality of compensation sensors. One of the compensation sensors is a temperature sensor 140. Another compensation sensor is a DC accelerometer 142 for measuring acceleration, vibration, or gravitational force. A third compensation sensor is a magnetometer 144 for measuring the magnitude and direction of a magnetic field. The compensation sensors provide acceleration, magnetic field, and temperature compensation signals. The output electrical signals of the compensation sensors are proportional to low-frequency linear (i.e. DC) acceleration, temperature, and magnetic heading. It is appreciated that the compensation sensors, such as magnetometer 144, may be placed outside of the housing of the system 100. For example, an out-board magnetometer may be placed at the rear end of an aircraft. Similarly, it is appreciated that in FIGS. 2 and 3, other components of the system 100 may be placed outside of the housing of the system 100.

An analog-digital converter (ADC) 138 converts the output electrical signals from the gyro sensors 136 and compensation sensors 140, 142, 144 into digital signals and sends the information to a microcontroller 126 for data processing.

Based on various sensor data, the microcontroller 126 provides the actual attitude, direction, and turn coordination information of the aircraft and sends the information to a LCD display 102. The microcontroller 126 performs a plurality of functions that process the signals from the converter 138 based on suitable software 150 or firmware instructions stored in memory 149. A CPU processor 146 of the microcontroller 126 determines attitude and heading reference. A memory 148 provides predetermined factory trim attitude information. The memories 148, 149 can be any suitable memories, such as EPROM, etc., and can be implemented either inside or outside of the microcontroller 126.

The standby gyroscopic navigation system 100 also includes a power management module 152 for supplying power to the first sensor module 122, the second sensor module 124, the microcontroller module 126, and the display 102. The power management module 152 includes a switch 153 capable of switching between a primary power source 154 and a battery power source 156. Under a normal condition, the switch is switched to connect to the primary power source 154, and at the mean time, the primary power source 154 charges battery of the battery power source 156. In the event that the primary power source 154 fails, the switch is switched to connect to the battery power source 156. The battery power source 156 then supplies power to the first and second sensor modules 122, 124, the microcontroller module 126, and the display 102, etc. Accordingly, the power management module 152 provides a constant voltage supply to the system 100, charging the battery power source 156 when the primary power source 154 is available, and reverting to the battery power source 156 if the primary power source 154 fails.

To accurately determine the attitude of an aircraft, the microcontroller 126 relies on several sensor inputs and a compensation method. The raw data from the sensors are relatively "clean" (i.e. signal-to-noise ratio is high) due to the differential nature of micro-gyros (see details below). Additional accuracy can be attained by removing signal perturbations caused by vibration, linear acceleration, altitude and temperature fluctuations. Also, an outer housing may be provided in the present invention for electromagnetic isolation (EMI), shock resistance, thermal isolation, and protection from other environmental anomalies, such as pressure fluctuation and humidity. Additionally, an integrated magnetometer provides accurate directional information over a long settling time.

Figure 3:
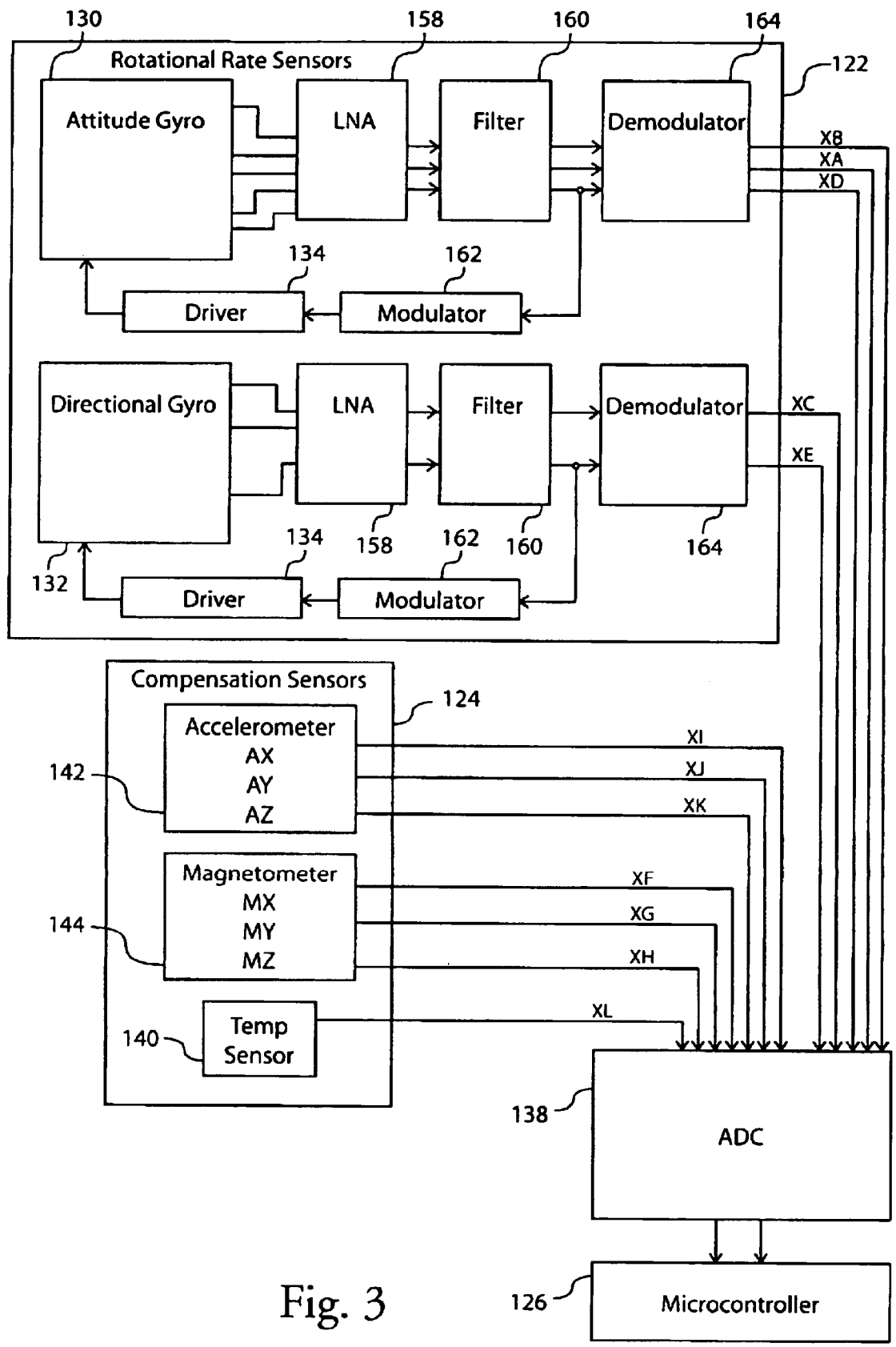
FIG. 3 is a functional block diagram of one embodiment of sensor modules and data signals of the gyroscopic navigation system, in accordance with the principles of the present invention.

Data signals XA, XB, XC sent to the microcontroller 126 are shown in FIG. 3. Note that reference signals XD, XE are also sent from each gyro that is proportional to a Z-axis output. These reference signals XD, XE are indicators of gyro operation and is analyzed by the microcontroller 126 to scale the raw gyro outputs and determine if the data is valid. A built-in self-test (BIST) routine may also interrogate these reference signals to ensure that the gyro is operating correctly, and that data signals are valid.

The microcontroller 126 operates from an operational program flow which contains the compensation, data scaling, and attitude extraction methods. The overall operational flow of the systems 120 is shown later in FIG. 9.

To some extent, each of the gyro outputs is responsive to all other sensor outputs and must be compensated to achieve highly accurate data. For instance, a pitch signal is most strongly related to an actual pitch rate of an aircraft in flight, but is also impacted by linear acceleration (or g-forces), temperature, and even the roll rate of an aircraft. Table 1 below defines each of the sensory inputs XA–XJ to the microcontroller 126, and Table 2 defines the relationship between them where the coefficients, ij, are the constants of proportionality between any two sensor signals for a linear relationship. It is appreciated to a person skilled in the art that other functions besides a linear relationship can be used within the scope of the present invention, for example, exponential, polynomial, logarithmic relationship.

TABLE 1

Definition of sensor data variables

| Variable Name | Description | Units |
|---|---|---|
| XA | Pitch Rate Signal | deg/sec |
| XB | Roll Rate Signal | deg/sec |
| XC | Yaw Rate Signal | deg/sec |
| XD | Rate reference Pitch/Roll | deg/sec |
| XE | Rate reference Yaw | deg/sec |
| XF | Magnetic Signal X | T |
| XG | Magnetic Signal Y | T |
| XH | Magnetic Signal Z | T |
| XI | Linear Acceleration X | g |
| XJ | Linear Acceleration Y | g |
| XK | Linear Acceleration Z | g |
| XL | Temperature | °C. |

TABLE 2

Parametric relationships

| | |
|---|---|
| True Pitch Rate YA | $YA = \alpha_{AA}XA + \alpha_{AB}XB + \alpha_{AC}XC + \alpha_{AD}(XA/XD) + \alpha_{AE}XE + \alpha_{AF}XF + \alpha_{AG}XG + \alpha_{AH}XH + \alpha_{AI}XI + \alpha_{AJ}XJ + \alpha_{AK}XK + \alpha_{AL}XL$ |
| True Roll Rate YB | $YB = \alpha_{BA}XA + \alpha_{BB}XB + \alpha_{BC}XC + \alpha_{BD}(XB/XD) + \alpha_{BE}XE + \alpha_{BF}XF + \alpha_{BG}XG + \alpha_{BH}XH + \alpha_{BI}XI + \alpha_{BJ}XJ + \alpha_{BK}XK + \alpha_{BL}XL$ |
| True Yaw Rate YC | $YC = \alpha_{CA}XA + \alpha_{CB}XB + \alpha_{CC}XC + \alpha_{CD}XD + \alpha_{CE}(XC/XE) + \alpha_{CF}XF + \alpha_{CG}XG + \alpha_{CH}XH + \alpha_{CI}XI + \alpha_{CJ}XJ + \alpha_{CK}XK + \alpha_{CL}XL$ |

As an example, for the compensated pitch rate YA (deg/sec), the coefficients:

$\alpha_{AA}=0.100$, $\alpha_{AB}=-0.100$, $\alpha_{AC}=-0.100$, $\alpha_{AD}=0.900$, $\alpha_{AE}=-0.000$, $\alpha_{AF}=-0.001$ deg/sec/T, $\alpha_{AG}=-0.001$ deg/sec/T, $\alpha_{AH}=-0.001$ deg/sec/T, $\alpha_{AI}=-0.100$ deg/sec/g, $\alpha_{AJ}=-0.010$ deg/sec/g, $\alpha_{AK}=-0.010$ deg/sec/g, $\alpha_{AL}=-0.010$ deg/sec/° C.

It is appreciated that other suitable factors may be used within the scope of the present invention.

Under normal operation of the system 100, an operating program preferably runs in a continuous loop. Within each loop, the first step is to assess the condition of the system. The data is collected so that the system determines whether the data falls within an expected range. If the data does not fall within the expected range, an error signal is generated, and the program may revert to a warning signal that alerts the user of possible failure. If the data is valid, the next step is to perform an average of several loop values, e.g. about ten (10) loop values. This averaging operation tends to smooth the data and reduce any noise generated during the analog-digital conversion. The averaged data is then subjected to the compensation method, such as the one outlined in Table 1 and Table 2. The final compensation operation is to average over a very long time constant, for example, approximately 10 minutes, to determine any systematic offset in the rate signal. Any residual offset determined by this final averaging operation is then subtracted from the rate signal. After these compensation sequences, the three primary rotational rates, YA, YB, and YC, are integrated to achieve a final attitude angle. This attitude information is sent to the LCD display 102. The operation of the system is further illustrated in a flow chart shown later in FIG. 9.

Still in FIG. 3, in the first sensor module 122, a first set of signals from the driver 134 are modulated with a carrier frequency by a modulator 162 and sent to the attitude gyro 130. The attitude gyro 130 provides rotational rate signals for a pitch angle and a roll angle. The signals are then sent to a low noise amplifier (LNA) 158 to be amplified and to a filter 160 for reducing random electrical noise. The filtered signals are outputted to a demodulator 164. The signals are then demodulated by the demodulator 164 so as to filter out the carrier frequency to obtain the signals representing pitch and roll angles. The signals from the filter 160 are also sent back to the modulator 162. For illustration purposes, the gyro 130 and 132 are shown in two separate data paths. It is appreciated that the gyros 130 and 132 can be implemented in one data path within the scope of the present invention.

Also in FIG. 3, similar to the attitude gyro 130, signals from the driver 134 are modulated with a carrier frequency by a modulator 162 and sent to the directional gyro 132, the directional gyro 132 provides rotational rate signals for a yaw angle. The signals are then sent to the low noise amplifier (LNA) 158 to be amplified and the filter 160 for reducing random electrical noise. The filtered signals are outputted to the demodulator 164. The signals are then demodulated by the demodulator 164 so as to filter out the carrier frequency to obtain the signals representing a yaw angle. The signals from the filter 160 are also sent back to the modulator 162.

In the second sensor module 124, the accelerometer 142 provides linear low-frequency acceleration readings along the x-y-z coordinates, respectively. The magnetometer 144 provides directional readings of a magnetic field along the x-y-z coordinates, respectively. The acceleration readings and directional readings are used to compensate correlated noise caused by acceleration, vibration, and magnetic field, respectively. Further, the temperature sensor 140 provides signals to compensate correlated noise caused by temperature. The compensation signals are then sent to the converter 138 to convert the signals to digital signals before they are sent to the microcontroller 126.

Figure 4:
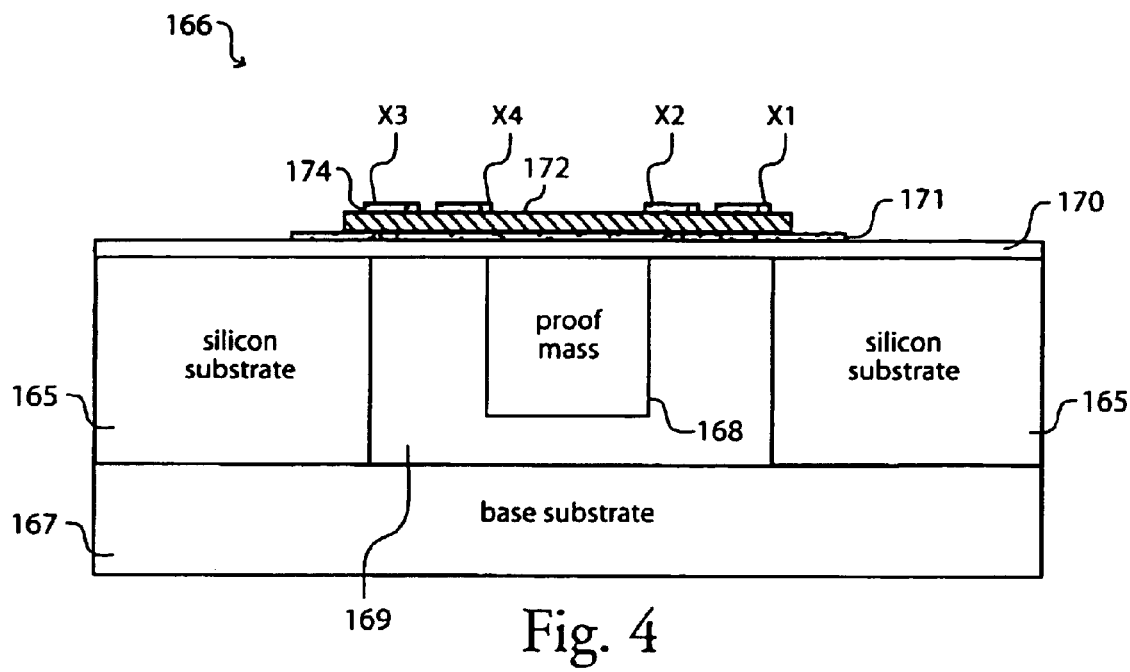
FIG. 4 is a cross-sectional view of one embodiment of a micro-gyro of the gyroscopic navigation system, in accordance with the principles of the present invention.

It is appreciated that the rotational rate sensors are solid-state, high-performance rotational rate sensors made of piezoelectric elements. The piezoelectric elements are made from a single sheet of piezoelectric material so that the elements possess uniform characteristics. In one embodiment as shown in FIG. 4, a micro-gyro 166 of the standby gyroscopic navigation system 100 in accordance with the principles of the present invention is provided. The micro-gyro 166 is a solid-state device fabricated on silicon wafers utilizing fabrication protocols common in the semiconductor industry. Similar to silicon integrated circuits (ICs), the micro-gyro 166 is built up by a series of thin films, typically less than or about 1 micron (0.001 mm) in thickness.

Figure 5:
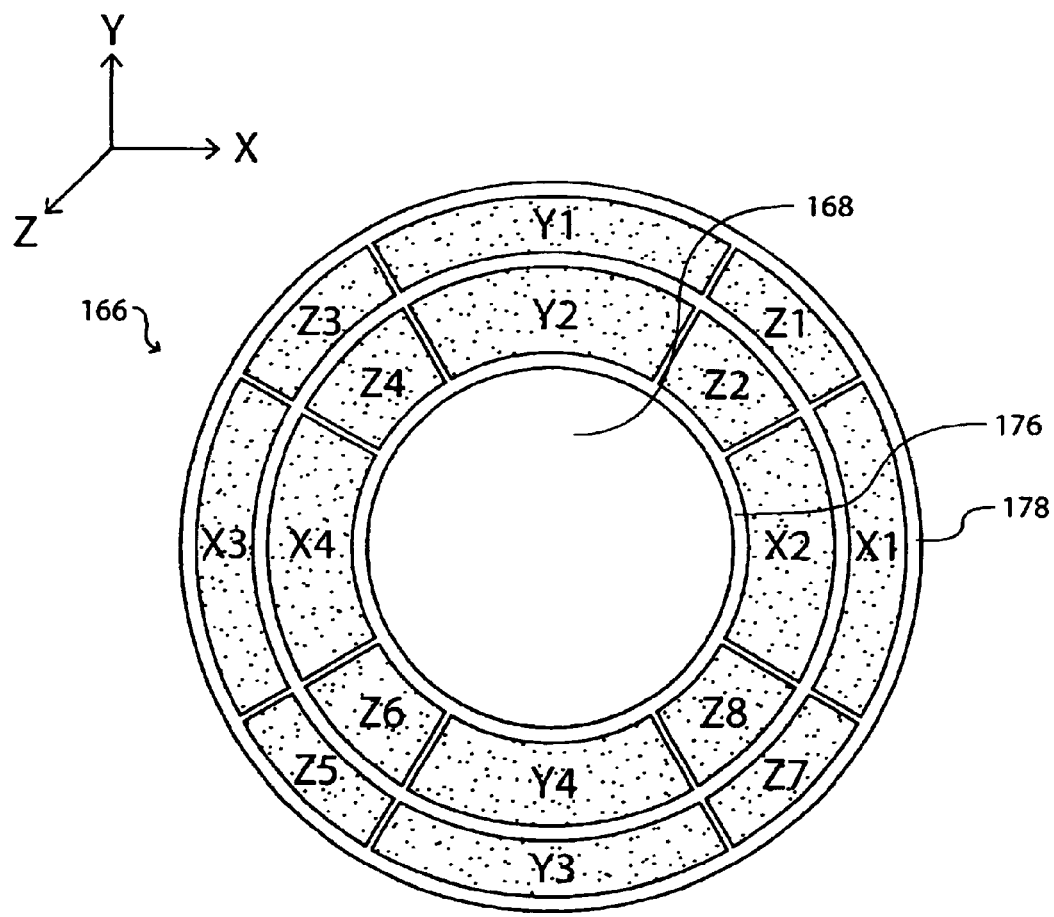
FIG. 5 is a top view of one embodiment of the micro-gyro of the gyroscopic navigation system, showing one arrangement of piezoelectric elements, in accordance with the principles of the present invention.

As shown in FIGS. 4 and 5, the micro-gyro 166 includes a silicon substrate 165 and a cylindrical silicon proof-mass 168 (often referred to as "inertial mass" or "seismic mass") that is suspended on a toroidal thin-film membrane 170. The silicon substrate 165 is supported between the thin-film membrane 170 and a base substrate 167. Clearance 169 is provided between the proof-mass 168 and the silicon substrate 165 such that the micro-gyro 166 has better shock resistance.

A plurality of thin-film piezoelectric elements, for example, X1, X2, X3, X4 in FIG. 4, and X1–X4 and Y1–Y4, and Z1–Z8 in FIG. 5 are disposed on the membrane 170. The height of the proof-mass 168 is preferably about 500 microns, the diameter of the proof-mass 168 is preferably about 400 microns, while the outer diameter of the membrane 170 is preferably about 700 microns. The membrane 170 can be made of a variety of different materials that exhibit flexibility, resistance to fatigue, and good thermal expansion match to the surrounding silicon substrate. Preferred materials for the membrane 170 are polycrystalline silicon or silicon nitride with a preferred typical thickness of 1 micron.

The piezoelectric elements are formed from a single layer of metal, preferably platinum about 0.1 micron of thickness, which forms a common lower electrode layer 171 and a single layer 172 of piezoelectric thin film, preferably PZT about 0.5 micron of thickness. By utilizing a single common layer for the lower electrode layer 171 and the piezoelectric thin film 172, matching between elements and element density is increased, and these factors improve the gyro's signal fidelity. Further, by using a single common electrode layer 171 and a single layer 172 of piezoelectric thin film, it reduces the number of electrical connections and cost, and improves reliability of the device. The piezoelectric elements are defined by upper metal electrodes 174, preferably platinum about 0.1 micron of thickness. Since the piezoelectric thin film 172 is non-conductive, each piezoelectric element is defined by the upper electrode 174 alone, and electrical communication between elements is negligible.

FIG. 5 illustrates a top view of one embodiment of the micro-gyro 166 of the standby gyroscopic navigation system 100, showing one exemplary arrangement of piezoelectric element placement, in accordance with the principles of the present invention. Piezoelectric elements X1–X4, Y1–Y4, and Z1–Z8 are arranged and configured in a circular shape on the suspended membrane toroid 170 bound by an inner ring 176 and an outer ring 178. The arrangement of piezoelectric elements includes differential pairs (i.e. X1 and X2) that reside on adjacent inner and outer regions of the membrane 170. Each pair is configured for optimal matching thereby minimizing random noise. For example, the piezoelectric elements X1 and X2 have identical electrode area and are placed at minimum spacing. Equal area of the elements allows the device to have matched impedance because the elements with equal area have the same material properties as well as the same temperature-electrical response.

In addition, in identical mirror-image pair is located on opposite side of the proof-mass 168 (i.e. X1/X2 and X3/X4). During operation, these quad pairs (2×2) generate electrical signals associated with motion along a particular coordinate axis. The differential nature and symmetric placement along the coordinate axes allows motion in other directions to be rejected, thereby increasing the signal accuracy. The amount of "off-axis rejection" is largely contributed by the symmetry of the pairs, matching of the elements, and precision placement. Such arrangement reduces the systematic drift and random noise normally present in a rotational rate sensor, thereby dramatically improving the performance of the system 100.

Sensing operation of the system 100 is based on the Coriolis Effect. In a normal operation, a periodic voltage is applied to elements Z1, Z3, Z5, and Z7. By the secondary piezoelectric effect (see definition in the Summary of the Invention), the membrane 170 under these four Z-elements is deflected, and the proof-mass 168 is driven into vibration along the Z-axis (perpendicular to the surface in FIG. 5) at the same periodic rate as the applied voltage. If a rotation is applied around the X-axis, a Coriolis force forms in the Y-axis direction. Similarly, if a rotation is applied around the Y-axis, a Coriolis force forms in the X-axis direction. The Coriolis force is proportional to the weight of the proof-mass 168, the oscillation frequency, the magnitude of oscillation, and the rate of rotation. The piezoelectric elements X1, X2, X3, and X4 detect the Coriolis force along the X-axis that is associated with rotation about the Y-axis. Similarly, the piezoelectric elements Y1, Y2, Y3, and Y4 detect the Coriolis force along the Y-axis that is associated with rotation about the X-axis.

Figure 6:
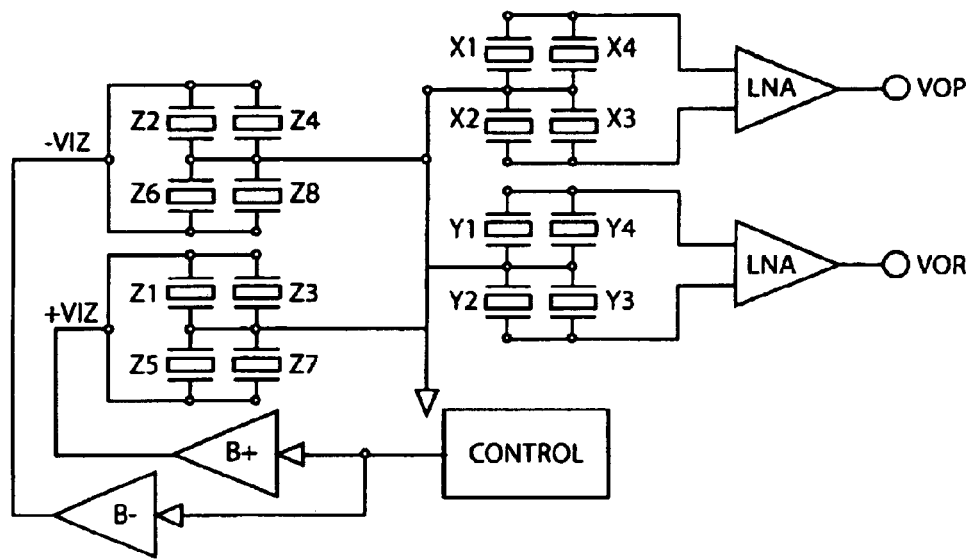
FIG. 6 is a schematic view of a first embodiment of a gyro electrical configuration for parallel connection of symmetric and differential elements without feedback for an z-axis vibration control, in accordance with the principles of the present invention.
Figure 7:
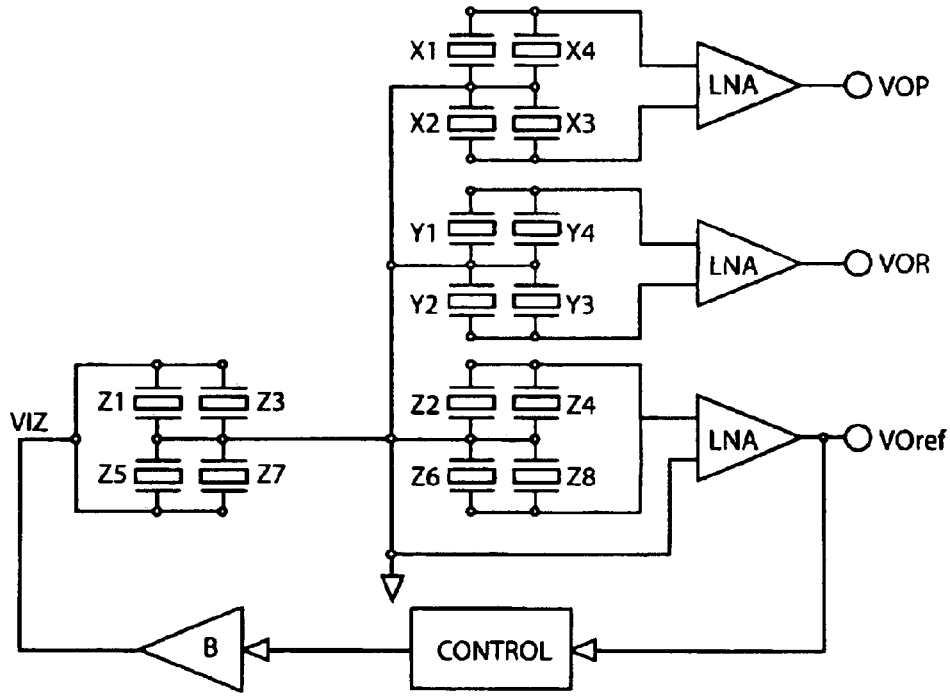
FIG. 7 is a schematic view of a second embodiment of a gyro electrical configuration for parallel connection of symmetric and differential elements with feedback for z-axis vibration control, in accordance with the principles of the present invention.
Figure 8:
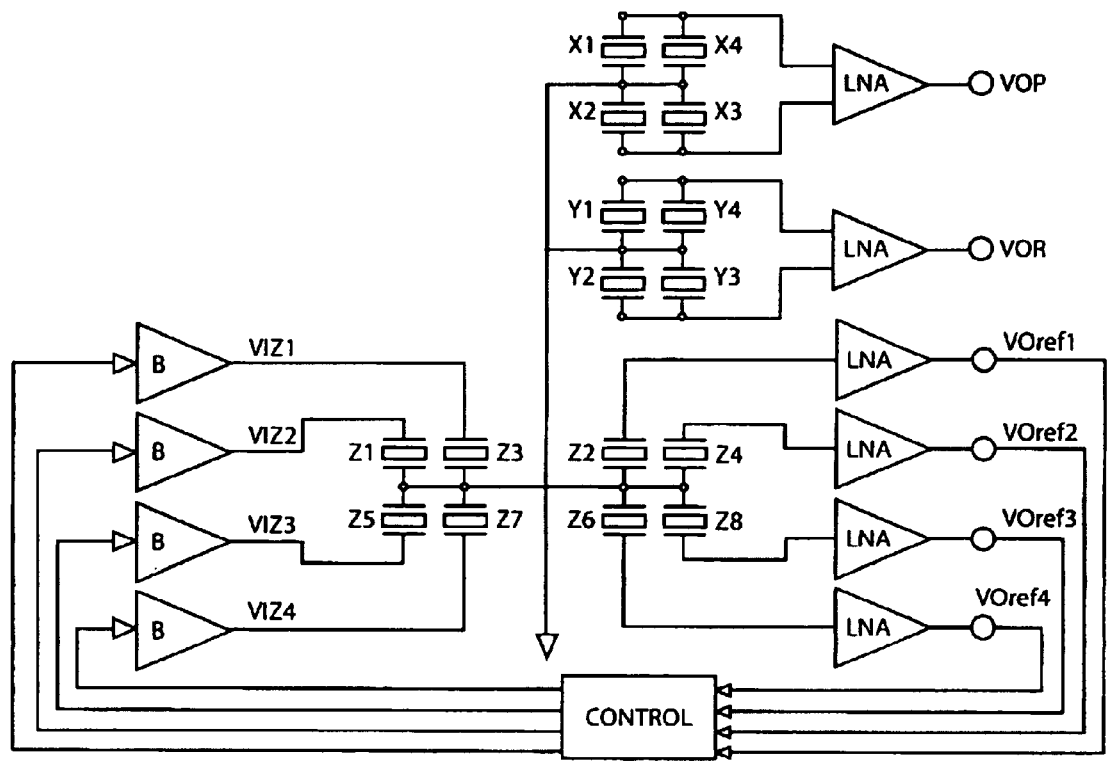
FIG. 8 is a schematic view of a third embodiment of a gyro electrical configuration for parallel connection of symmetric and differential elements with feedback for adaptive z-axis vibration control, in accordance with the principles of the present invention.

The elements Z2, Z4, Z6, and Z8 can be used for several different functions. In one embodiment as shown in FIG. 6, these elements may be driven with a periodic voltage 180° out of phase with respect to elements Z1, Z3, Z5, and Z7. Output Voltages $Vo_p$, $Vo_r$ ("p" stands for "pitch", and "r" stands for "roll") are sent to the filter 160. In a preferred embodiment, elements Z2, Z4, Z6, and Z8 are operated as sensors that provide an output Voltage proportional to the vibration along the Z-axis as shown in FIG. 7. In still another embodiment, the vibration along the Z-axis can be tuned and equalized by independently sensing and driving each of the Z-elements as shown in FIG. 8 to further reduce non-idealities in the vibration mode. In the embodiments of FIG. 7 and FIG. 8, output Voltages $Vo_{ref}$, $Vo_{ref1}$, $Vo_{ref2}$, $Vo_{ref3}$, $Vo_{ref4}$ generated from the Z2, Z4, Z6, and Z8 elements can be used in a feedback loop to control the periodic driving signal. This feedback mode of operation provides immunity to temperature variation and other environmental anomalies and improves the overall fidelity of the gyro performance. The quality of piezoelectric matching and symmetry enable this mode of operation.

It is appreciated that the micro gyro 166 can be used in a variety of applicable industries for detecting sensitive motion movements in accordance with the principles of the present invention. For example, the micro gyro 166 can be used in the automobile industry for detecting roll-over motion, anti-lock brake motion, etc.; in the consumer electronics industry for motion activating Personal Data Assistant (PDA) devices, cell phones, etc., for remote data entry, etc., or for compensating lens based on camera motion; in the medical device industry for monitoring patients' activities, bio-response, automatically adjusting devices, such as defibrillators, pacemakers, etc.; or in the defense industry for detecting motion of satellite dishes, etc. The application of the micro gyro 166 on the gyroscopic navigation system 100 for aircraft instruments is merely one example of many applications.

Figure 9:
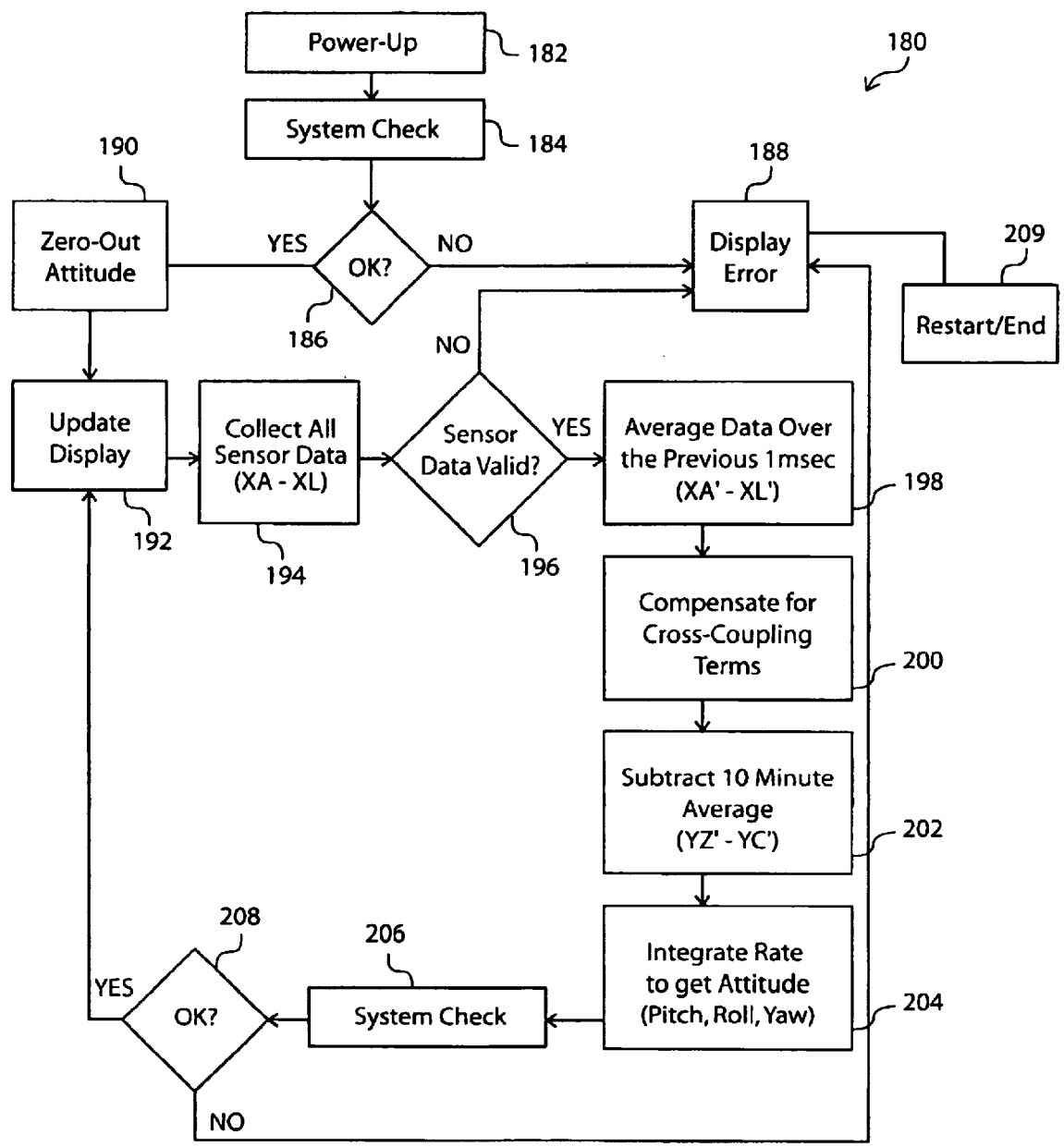
FIG. 9 is an operational flow of an operation of the gyroscopic navigation system, in accordance with the principles of the present invention.

FIG. 9 illustrates an operational flow diagram of a standby gyroscopic navigation operation 180 in accordance with the principles of the present invention. The operation 180 starts with an operation 182 of powering up the system, and an operation 184 of checking the system. If the system is not operating in a normal condition from a determination operation 186, the system displays an error in an operation 188. If the system is operating in a normal condition from the determination operation 186, the system is reset to clear any prior attitude information in an operation 190. Then, information on the display is updated in an operation 192. Next, all sensor data are collected in an operation 194. If the sensed data is not valid from a determination operation 196, the system displays error in the operation 188. If the sensed data is valid from the determination operation 196, average data for XA to XL over the previous period of time, e.g. 1 ms (millisecond), are calculated in an operation 198.

Then, the system compensates for cross-coupling terms as shown in Table 1, in an operation 200. For example, cross-coupling terms for YA is XB to XL. Next, average data for YA to YC for a period of time, such as 10 minutes, are calculated in an operation 202. Then, the system integrates rate to obtain attitude information including pitch, roll, and yaw in an operation 204. Next, a system check operation 206 is performed. If the system operates in a normal condition from a determination operation 208, the system displays the updated attitude information in the operation 192. If the system does not operate in a normal condition from the determination operation 208, the system display error in the operation 188.

These operations continue until an aircraft stops its operation. Once the system displays error, the system can be restarted or ended in an operation 209. It is appreciated that a longer period of time can be calculated in the operation 202. Accordingly, a longer holding time, when an aircraft makes a constant angle turn and holds at that angle, can be achieved. Thus, the dynamic stability is significantly improved.

Figure 10:
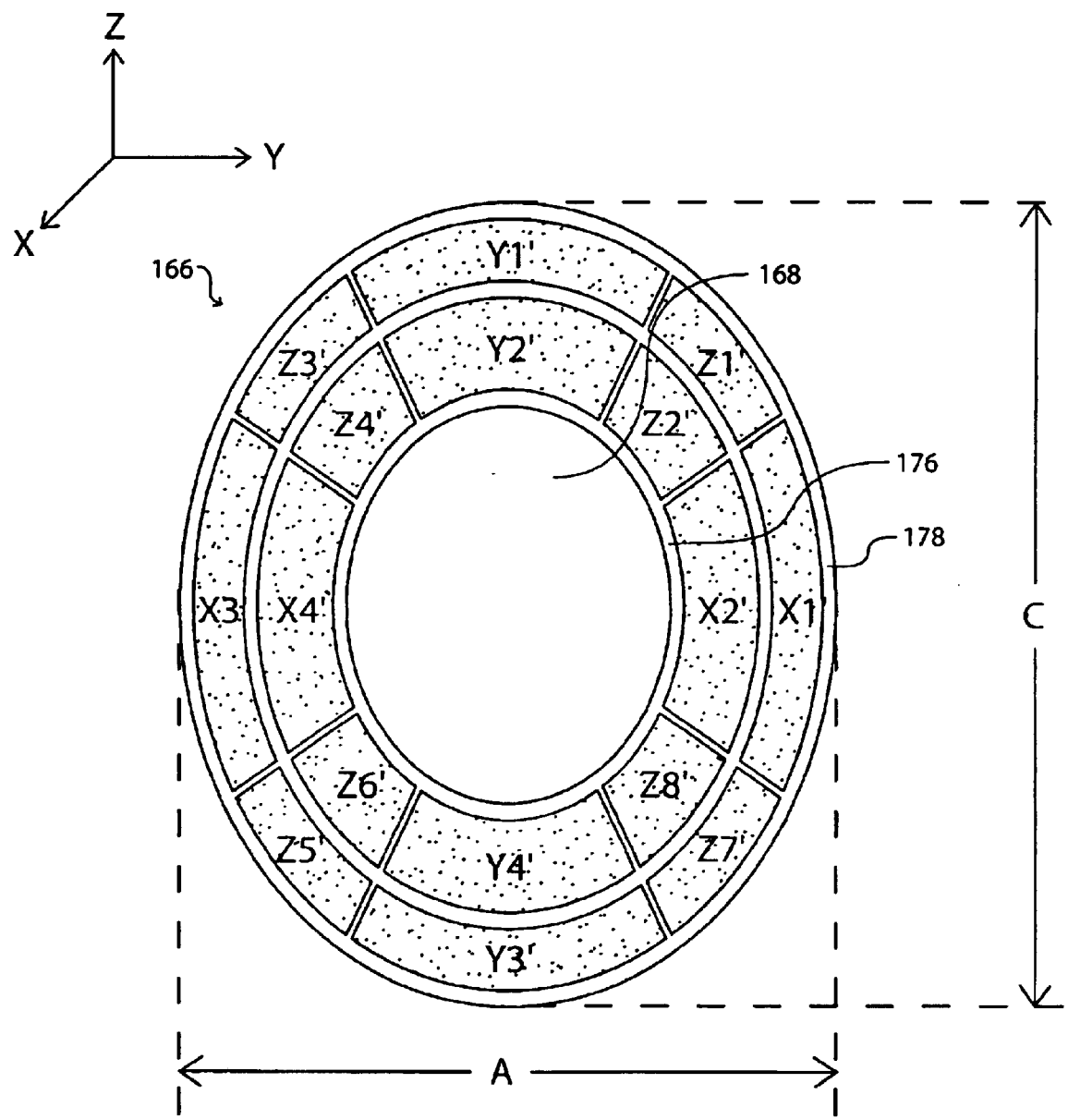
FIG. 10 is a top view of the embodiment of the micro-gyro of the gyroscopic navigation system, showing an alternative arrangement of piezoelectric elements, in accordance with the principles of the present invention.

FIG. 10 illustrates an alternative arrangement of piezoelectric elements of a micro-gyro 166' of the standby gyroscopic navigation system 100. Instead of being arranged and configured in a circular shape, piezoelectric elements X1'–X4', Y1'–Y4', and Z1'–Z8' are arranged and configured in an oval shape on the suspended membrane toroid 170 bound by an inner ring 176' and an outer ring 178'.

Similar to the arrangement shown in FIG. 5, the arrangement in FIG. 10 includes differential pairs of the piezoelectric elements that reside on adjacent inner and outer regions of the membrane 170. Each pair is configured for optimal matching there by minimizing random noise. Also, the pairs have identical electrode area and are placed at minimum spacing.

Figure 11A:
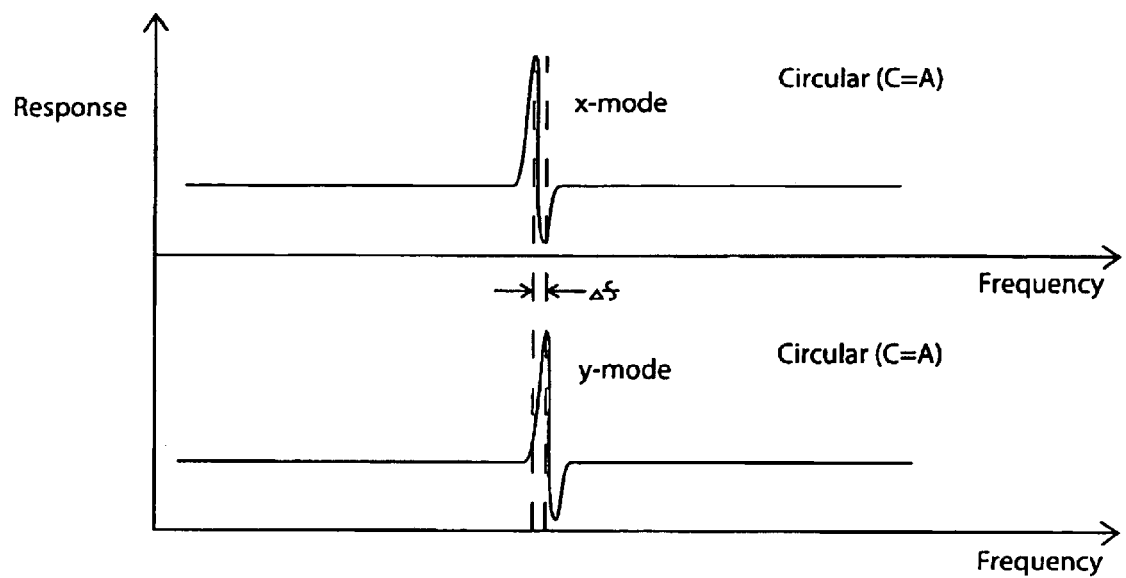
FIGS. 11(a) and 11(b) are schematic views of resonant vibration frequency comparison between a circular shape arrangement and an oval shape arrangement of piezoelectric elements.
Figure 11B:
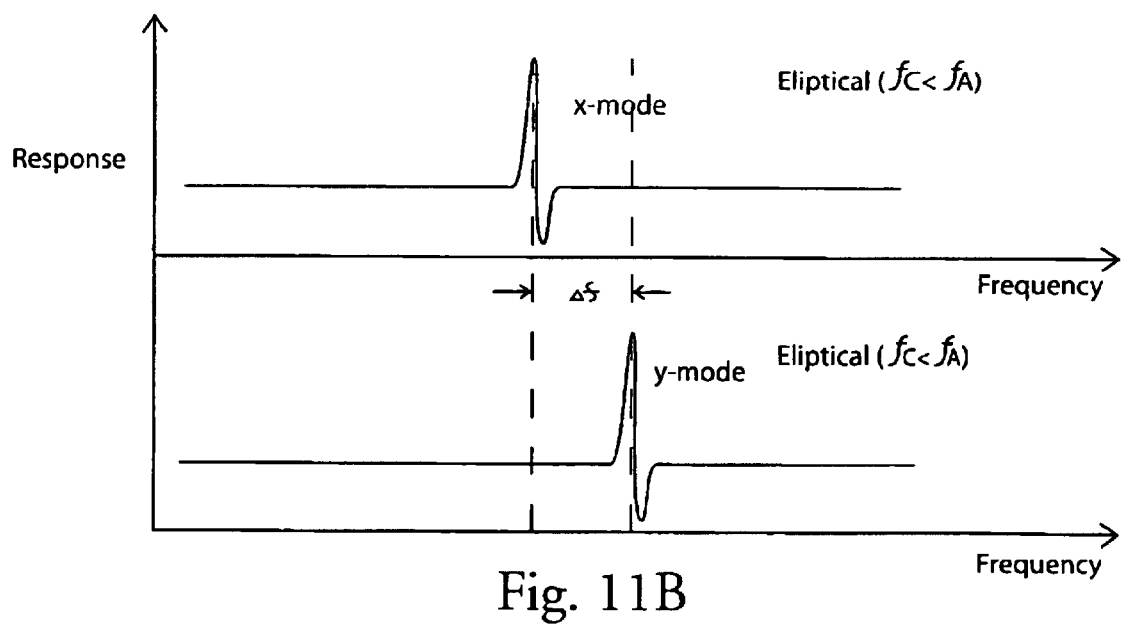

Further, an identical mirror-image pair is located on opposite side of a proof mass 168'. The electrodes and their respective functions are identical to the circular embodiment. However, the resonant vibration frequency in the X-direction shifts relative to the resonant vibration frequency in the Y-direction in proportion to the ratio C:A as shown in FIG. 10. C is the length of the oval shape, and A is the width of the oval shape. FIG. 11(a) illustrates the resonant behavior for the circular arrangement, and FIG. 11(b) illustrates the resonant behavior for the oval or elliptical arrangement. Frequency offset Δf is proportion to the ratio C:A. Such offset in resonant frequency further enhances the stability of the system 100 because the resonant vibration modes parallel to the element surface are not closely coupled.

In addition, the gyroscopic navigation system described above can be configured on a multi-sensor chip in accordance with the principles of the present invention. The gyro and the other compensation sensors, such as the acceleration sensor, are configured and fabricated in a single silicon substrate. The compensation sensor is generally used to increase the overall accuracy. The advantage of this embodiment is that the compensation signals are highly correlated to the rotational sensor signals. The high correlation is achieved from the fact, but not limited to, that the sensors are physically located in very close proximity and witness the same effects, manufactured using the same fabrication steps, and affected in a similar manner by temperature and electronic noise due to their similar structure. At the system or sub-system level, the multi-sensor chip also provides an improved degree of accuracy and compensation.

Figure 12A:
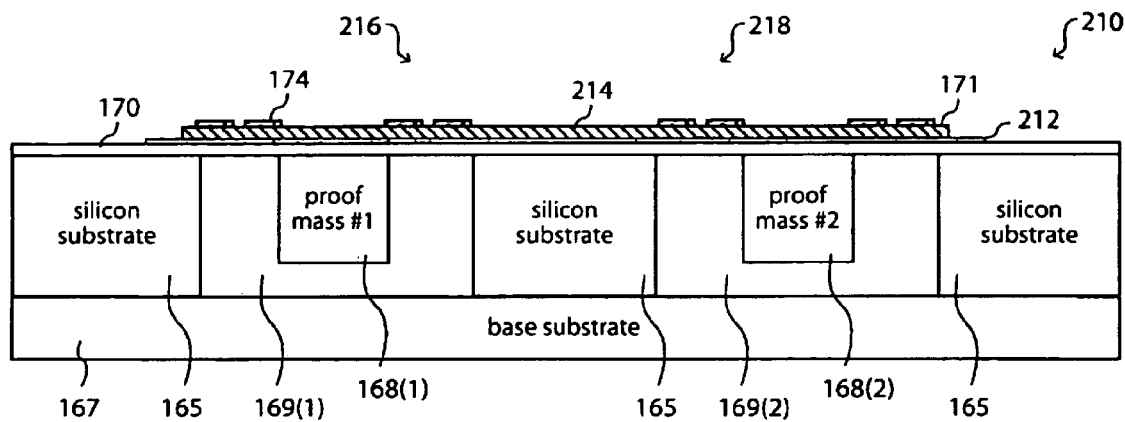
FIG. 12(a) is a cross-sectional schematic view of the gyroscopic navigation system configured on a multi-sensor chip with shared lower electrode layer and shared piezoelectric layer in accordance with the principles of the present invention.
Figure 12B:
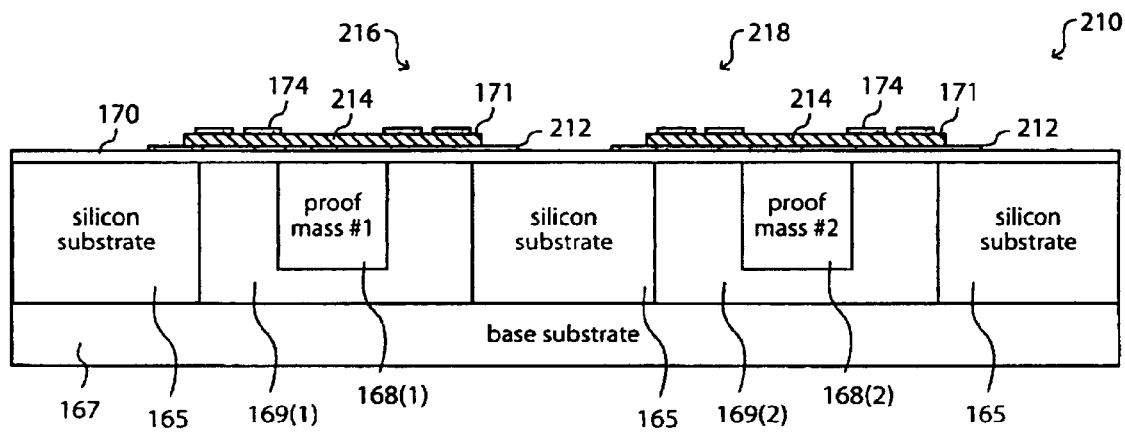
FIG. 12(b) is a cross-sectional schematic view of the gyroscopic navigation system configured on a multi-sensor chip with separate lower electrode layer and separate piezoelectric layer in accordance with the principles of the present invention.

FIGS. 12(a) and 12(b) illustrate two different embodiments of a multi-sensor chip 210. FIG. 12(a) shows the gyroscopic navigation system configured on the multi-sensor chip 210 having two sensors 216, 218 with shared lower electrode layer 212 and shared piezoelectric layer 214. FIG. 12(b) shows the gyroscopic navigation system configured on the multi-sensor chip 210 having the two sensors 216, 218 with separate lower electrode layer 212 and separate piezoelectric layer 214. It is appreciated that the number of sensors configured on the multi-sensor chip 210 can be varied within the scope of the present invention.

Figure 13:
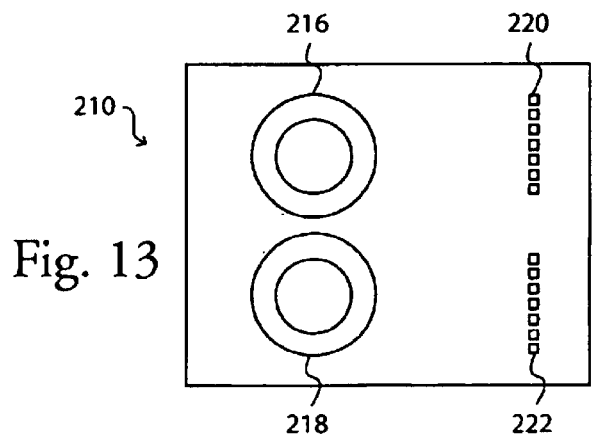
FIG. 13 is a top schematic view of one embodiment of the gyroscopic navigation system configured on a multi-sensor chip in accordance with the principles of the present invention.

FIG. 13 is a top view of the multi-sensor chip 210 including the sensors 216 and 218 and a plurality of electronic bonding pads 220, 222 for output connections. As illustrated, the sensors 216 and 218 are in a circular shape. It is appreciated that the sensors may be configured in many other shapes, such as the oval shape as illustrated in FIG. 10.

Figure 14:
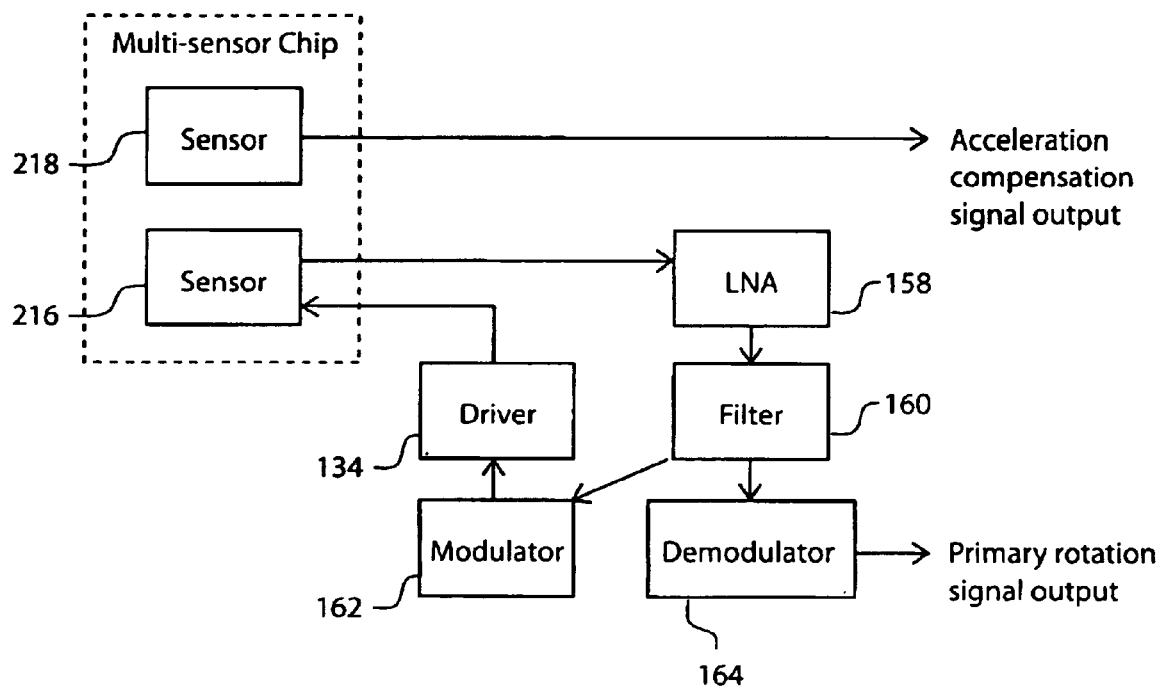
FIG. 14 is a functional block diagram of one embodiment of the gyroscopic navigation system configured on a multi-sensor chip in accordance with the principles of the present invention.

FIG. 14 is a functional block diagram of one embodiment of the gyroscopic navigation system configured on a multi-sensor chip 210. The first sensor 216 is connected to an oscillatory feedback circuit as described above in FIGS. 2 and 3 to operate as the gyroscope or rotational rate sensor 122. The second sensor 218 is connected to an amplification circuit and provides acceleration outputs as described above in FIGS. 2 and 3 to operate as the compensation sensor, such as the DC accelerometer 142.

Although the present invention has been described with reference to preferred embodiments, persons skilled in the art will recognize that changes may be made in form and detail without departing from the spirit and scope of the invention. For example, it is appreciated that the gyros may be other types of solid-state gyros, such as quartz solid-state gyros.

What is claimed is:

1. A gyroscopic navigation system, comprising:
   a first sensor module, having a plurality of electrical rotational rate sensors, for providing a plurality of rotational rate signals;
   a second sensor module, having a plurality of electrical compensation sensors, for providing a plurality of compensation signals;
   a microcontroller module, coupled to the first and second sensor modules, for processing the rotational rate signals and the compensation signals and generating attitude information, directional information, and turn coordinate information;
   a display, coupled to the microcontroller module, for displaying the attitude information, the directional information, and the turn coordinate information simultaneously;
   wherein the rotational rate sensors are made of piezoelectric elements, the piezoelectric elements are made from a single sheet of piezoelectric material;
   wherein one of the rotational sensors is a directional gyro, and another rotational sensor is an attitude gyro;
   wherein each of the directional and the attitude gyros is a three-dimensional solid-state gyro which comprises:
      a substrate having a proof-mass;
      a membrane, the proof-mass being suspended on the membrane;
      a single common electrode layer being disposed on the membrane; the single sheet of piezoelectric material being disposed on the single common electrode layer; and
      a plurality of electrodes being disposed on the single sheet of piezoelectric material in a thin-film format, the rotational rate signals being outputted through the electrodes, wherein each of the electrodes, the piezoelectric material, and the single common electrode layer form a plurality of piezoelectric elements; and
   wherein the compensation sensors provide acceleration, magnetic field, and temperature compensation signals to reduce correlated noise caused by acceleration, magnetic field, and temperature.

2. The system of claim 1, wherein the piezoelectric elements are arranged and configured in a circular shape with a plurality of pairs of piezoelectric elements, one element in a pair is disposed on an inner ring of the circular shape, and the other element in the pair is disposed on an outer ring of the circular shape.

3. The system of claim 1, wherein the two elements of the pair have equal area.

4. The system of claim 3, wherein each pair of piezoelectric elements has a mirror image pair of piezoelectric elements disposed on opposite side of an axis passing through a center of the proof-mass.

5. The system of claim 1, wherein the piezoelectric elements are arranged and configured in an oval shape with a plurality of pairs of piezoelectric elements, one element in a pair is disposed on an inner ring of the oval shape, and the other element in the pair is disposed on an outer ring of the oval shape.

6. The system of claim 5, wherein the two elements of the pair have equal area.

7. The system of claim 6, wherein each pair of piezoelectric elements has a mirror image pair of piezoelectric elements disposed on opposite side of an axis passing through a center of the proof-mass.

8. An aircraft instrument system, comprising:
   a plurality of aircraft primary instruments including a mechanical attitude gyro, a mechanical directional gyro, a mechanical-electrical turn coordinator/slip-skid indicator;
   a standby gyroscopic navigation system connected independently of the primary instruments;
   electrical power having a primary power source and a battery power source, the primary power source supplying power to the primary instruments and the standby gyroscopic navigation system, the standby battery power source supplying power to the standby gyroscopic navigation system to provide attitude information, directional information, and turn coordination information when the primary power source fails;
   wherein standby gyroscopic navigation system includes:
      a first sensor module, having a plurality of electrical rotational rate sensors, for providing a plurality of rotational rate signals;
      a second sensor module, having a plurality of electrical compensation sensors, for providing a plurality of compensation signals;
      a microcontroller module, coupled to the first and second sensor modules, for processing the rotational rate signals and the compensation signals; and
      a display, coupled to the microcontroller module, for displaying attitude information, directional information, and turn coordinate information simultaneously;
   wherein the rotational rate sensors are made of piezoelectric elements, the piezoelectric elements are made from a single sheet of piezoelectric material;
   wherein one of the rotational sensors is a directional gyro, and another rotational sensor is an attitude gyro; and wherein each of the directional and the attitude gyros is a three-dimensional solid-state gyro which comprises:
- a substrate having a proof-mass;
- a membrane, the proof-mass being suspended on the membrane;
- a single common electrode layer being disposed on the membrane; the single sheet of piezoelectric material being disposed on the single common electrode layer; and
- a plurality of electrodes being disposed on the single sheet of piezoelectric material in a thin-film format, the rotational rate signals being outputted through the electrodes, wherein each of the electrodes, the piezoelectric material, and the single common electrode layer form a plurality of piezoelectric elements; and wherein the compensation sensors provide acceleration, magnetic field, and temperature compensation signals to reduce correlated noise caused by acceleration, magnetic field, and temperature.

9. The system of claim 8, wherein the piezoelectric elements are arranged and configured in a circular shape with a plurality of pairs of piezoelectric elements, one element in a pair is disposed on an inner ring of the circular shape, and the other element in the pair is disposed on an outer ring of the circular shape.

10. The system of claim 9, wherein the two elements of the pair have equal area.

11. The system of claim 10, wherein each pair of piezoelectric elements has a mirror image pair of piezoelectric elements disposed on opposite side of an axis passing through a center of the proof-mass.

12. The system of claim 8, wherein the piezoelectric elements are arranged and configured in an oval shape with a plurality of pairs of piezoelectric elements, one element in a pair is disposed on an inner ring of the oval shape, and the other element in the pair is disposed on an outer ring of the oval shape.

13. The system of claim 12, wherein the two elements of the pair have equal area.

14. The system of claim 13, wherein each pair of piezoelectric elements has a mirror image pair of piezoelectric elements disposed on opposite side of an axis passing through a center of the proof-mass.

* * * * *